United States Patent Office  3,451,886
Patented June 24, 1969

3,451,886
METHOD OF MAKING IMPROVED GLASS FIBER MATERIAL AND LAMINATES THEREOF
William J. Eakins, Wilbraham, Mass., assignor to A. Wimpfheimer & Bro., Inc., Stonington, Conn., a corporation of New York
No Drawing. Filed Apr. 21, 1966, Ser. No. 544,075
Int. Cl. B32b 17/02, 27/38
U.S. Cl. 161—93          17 Claims

ABSTRACT OF THE DISCLOSURE

A method for treating glass fibers for making glass-resin composites and laminates whereby the glass fibers are treated with a hydrolyzed solution of an organo-chromic chloride and an organo-silane.

BACKGROUND

This invention relates to glass-resin composites and laminates and in particular, it relates to the treatment of glass textiles with improved coupling agent compositions in order to obtain superior textile properties and resin bonding.

Textile fiber glass and other forms of glass fibers are widely used in industrial processes to make structures and articles of manufacture of innumerable variety from skiis to missile components. One particularly well known use is the formation of laminates by the employment of various thermosetting resins. In the laminate field, it is known that to a major degree, the strength, and to a minor degree, the modulus of elasticity of a glass fabric reenforced laminate depends upon the bond between the glass and the laminating resin. Moreover, the permanence of the bond when the laminate is subjected to moisture, is a critical parameter in the service life of the laminate.

In its manufacture, glass fibers for textiles are usually coated with a starch and oil size to improve handleability and weave processing. The size must be removed, however, to obtain suitable bonding between glass and resin. This type of treating process is generally known as "heat cleaning," after which a coupling agent is applied to the fiber glass to chemically bond to both the glass and the resin used to form the laminate.

In general, either an organo-chromic chloride or organo-silane coupling agent is used for glass fabric-resin bonding. The choice of one or the other of these depends upon the properties desired. When the chloride type of coupling agent is used, the resulting fabric generally has a soft hand, i.e., the fabric is soft, pliable and drapes readily. However, the organo-chromic chlorides do not always provide in laminates high initial or dry strength when applied to fabrics or textile products, and seldom improve to any significant degree the resistance of the laminate to long term service in water or moist environments.

Unlike the organo-chromic chlorides, the organo-silanes, when applied in effective quantities, tend to produce fabrics or stiffer hand, which do not readily wet out, thus the fabrics are resistant to form shaping as they do not lend themselves to void free multi-ply packing and conformation to various mold contours. However, in contrast to the organi-chromic chlorides, the organo-silanes contribute to a markedly higher retention of strength under long term wet environment service conditions in laminates.

The principal object of my invention is to provide coupling agent compositions and methods of application to glass fibers, wherein glass fabrics woven from the treated glass fibers have a soft hand, and when used to form resin-glass fabric laminates exhibit both good dry strength and long term wet strength.

It is a further object of this invention to provide coupling agents which so improve the rate at which glass fabrics wet with resin that the problem of air entrapment in the wet out process is practically eliminated.

It is another object of this invention to produce a fabric which when wet with a thermosetting or like resin will contribute high dry strength and modulus properties to the laminate, as well as long term wet strength.

A still further object of this invention is to enhance the clarity of laminates by reducing the interference to light transmission at the glass-resin interface.

Generally speaking, the organo-chromic chloride compounds employed in this invention are Werner complex compounds. The particular Werner complex compounds employed are characterized by a trivalent nuclear chromium atom in association with an aromatic group, namely, a substituted phenyl group. In further definition, the following structural formula will demonstrate some of the substitutions in the phenyl group mentioned above:

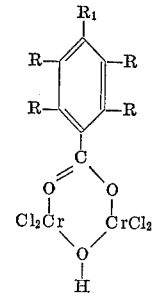

wherein R is a member of the group consisting of —OH and hydrogen and $R_1$ is a member of the group consisting of —OH, hydrogen, and —NH$_2$. It will be noted that the substitutions for the phenyl group are in fact resin reactive and therefore will hereinafter be referred to as resin reactive groups. The following are given as examples of the organi-chromic chlorides of the invention: 2,4-dihydroxybenzoato chromic chloride, 2,5-dihydroxybenzoato chromic chloride, o-hydroxybenzoato chromic chloride, p-hydroxybenzoato chromic chloride, 3,4,5-trihydroxybenzoato chromic chloride, p-aminobenzoato chromic chloride, etc. While the preparation of these compounds form no part of this invention per se, methods of their preparation are disclosed in U.S. Patents Nos. 2,544,666, 2,544,667 and 2,733,182.

The organo-silanes employed in the invention may be characterized by the following formula:

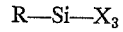

wherein R is an organic resin reactive group, and X is a hydrolyzable group such as halo, alkoxy, acetoxy and amino. Examples of the organo-silanes that may be employed are: methacroxypropyl trimethoxy silane, glycidoxy propyl trimethoxy silane, anilino propyl trimethoxy silane, methacroxypropyl trichloro silane, chloro propyl trichloro silane, etc. The organo-silanes of this invention may be prepared by a number of methods, one of which is disclosed in U.S. Patent No. 2,946,701.

As mentioned earlier, this invention involves novel coupling agent compositions. Basically, the coupling agents embodying this invention comprise the reaction product of organo-chromic chloride and organo-saline.

As in the case of applying an organo-chromic chloride or an organo-silane alone to glass, the coreacted composition must be modified in such a way in solution so as to give a hydroxyl nature to the solution. The formed hydroxyl groups appear to be glass reactive, and come into play for further cross-bonding between the organo-silane and the organo-chromic chloride.

While the exact reaction mechanism is not fully understood, it is felt that there is cross-bonding between the two constituents by hydroxyl groups forming "hydroxyl bridges." This reaction is known as olation, which in this case is accomplished by hydrolysis of the constituents in an aqueous solution. As this is the case, it follows that the resin reactive groups of the organo-chromic chlorides and erally outlined above. In particular, the organo-chrome was added to approximately 1250 ml. of water (unless otherwise indicated) followed by the addition of the organo-silane as indicated. The pH adjustment referred to above and referenced in the table was made with a 1% ammonium hydroxide solution.

| Sample No. | Organo-chrome | | Organo-silane | | | | Final pH |
|---|---|---|---|---|---|---|---|
| | Chrome | Amt. gm. | Silane | Amt. gm. | Solvent | Amt. gm. | |
| 1A | Gallato chromic chloride* | 3 | Methacroxy propyl trimethoxy silane. | 6 | | | 5.5 |
| 1B | do | 6 | do | 3 | | | 5.5 |
| 1C | do | 9 | do | 0 | | | 6.0 |
| 1D | do | 0 | do | 6 | | | 5.5 |
| 2A | do | 3 | Glycidoxy propyl trimethoxy silane. | 6 | | | 5.5 |
| 2B | do | 6 | do | 3 | | | 5.0 |
| 2C | do | 9 | do | 0 | | | 6.0 |
| 2D | do | 0 | do | 6 | | | 6.0 |
| 2E | do | 0 | do | 3 | | | 6.0 |
| 3A | Gallato chromic chloride in 1,000 gm. of H$_2$O. | 6 | Anilino propyl trimethoxy silane. | 3 | DMF¹ | 250 | 5.5 |
| 3B | Gallato chromic chloride | 9 | do | 0 | | | 6.0 |
| 3C | do | 0 | Anilino propyl trimethoxy silane (in 1,000 gm. of H$_2$O). | 3 | DMF | 250 | 5.5 |
| 4A | β-Resorcylato chromic chloride. | 3 | Methacroxy propyl trichloro silane. | 6 | Acetone | 3 | 5.0 |
| 4B | do | 6 | do | 3 | Acetone | 3 | 6.0 |
| 4C | do | 9 | do | 0 | | | 5.0 |
| 4D | do | 0 | do | 6 | Acetone | 3 | 5.5 |
| 5A | do | 3 | Methacroxy propyl trimethoxy silane. | 6 | | | 6.0 |
| 5B | do | 9 | do | 0 | | | 5.0 |
| 5C | do | 0 | do | 6 | | | 5.5 |

¹ Dimethyl formamide.

the organo-silanes remain free to react with the bonding resin. I have found that although both the organo-chromic chlorides and the organo-silanes are resin reactive, in the combined form of the invention an excellent resin bond is achieved when only one of the constituents reacts with a particular resin. In this regard, a coupling composition comprised of the reaction product of methacroxypropyl trichloro silane and β-resorcylato chromic chloride, when applied to a glass fabric, is reactive with either a polyester resin or with an epoxy resin. This is so because the resin reactive group of the organo-chromic chloride (namely, 2,4-dihydroxy benzoic acid) is epoxy reactive, while the methacroxypropyl group of the organo-silane is polyester reactive.

Because of the importance of hydrolyzing the combined coupling compositions, it is preferable that they be applied from an aqueous solution to the glass fabric. The following example demonstrates the preparation of mixed organo-chrome-organo-silane aqueous solutions and lists a variety of them.

Generally speaking the combined coupling compositions are made up by first adding the organo-chrome to distilled water with moderate to vigorous stirring. To this solution is added the organo-silane also with vigorous stirring. I have found that for optimum results, the organo-chromes and the organo-silanes each may be added in amounts of from 0.25 to 0.5% based on the total weight of the final application solution and the ratios of the organo-chrome present to organo-silane may be between 90/10 and 10/90 parts. Preferably, the organo-silane should be employed in the lesser quantities as the more organo-silane used, the stiffer the fabric tends to become due to bridging between the glass fibers.

After the mixture has been prepared, the pH is adjusted to a point where the mixture is short of being cloudy, usually between pH 3.5 to 6.5. It is important that the mixture be maintained at a pH less than that that would cause the mixture to turn cloudy, as the formation of cloudiness indicates polymerization. Upon standing, the pH will tend to drop, this being a sign of continuing hydrolysis; therefore, adjustments in the pH may be made any time as needed. However, unless polymerization actually takes place, the mixture may still be used even though cloudy.

EXAMPLE I

In each of the samples listed below the organo-chrome-organo-silane coupling composition was prepared as gen- Within eight hours of their formulation each of the solutions listed above was applied to a glass fabric. The particular fabric employed is a three dimensional fabric woven using a double shuttle technique. This type of material consists of a woven top and bottom fabric mutually connected by a multiplicity of tie threads, and having stuffer yarns longitudinally disposed between the face fabrics. In all cases, the squeeze-out of the fabric was regulated to give a liquid pick-up of 30% and all sample solutions, except 3A, 3B, and 3C, were oven dried at 325° F. after application to the fabric. Solution samples 3A, 3B, and 3C were oven dried at 235–245° F. It should be noted that higher drying temperatures of about 450° F. can be used where apparatus such as jet driers or the like are employed.

EXAMPLE II

Following application of the coupling agents described above, laminates having an average thickness of ⅛ inch were formed using a plurality of fabric layers, and an epoxy resin having an amine curing agent was applied.

The epoxy resin used in forming the laminates was prepared by stirring into 150 grams of the diglycidyl ether of Bisphenol A, 21 grams of metaphenylene diamine heated to 140° F.

Next, fabric finished with the various solution samples of Example I were cut into rectangular pieces 6 inches in the warp direction by 9½ inches in the fill direction. These various pieces were then placed into the epoxy resin which had previously been poured to form a puddle on a flat sheet of cellophane.

After the fabric had become wetted by wicking the resin, an additional quantity of resin was poured on top of the fabric layer and another piece of fabric added. When the second fabric was wet by its wicking action, additional resin was poured on the center of the upper fabric layer and another piece of cellophane added to cover the top layer. This second layer of cellophane extended outwardly of the fabric sufficiently in all directions to permit the formation of a bag by sealing together about three sides the edges of the upper and lower sheets of cellophane with one edge being left open. At this point, the laminate was carefully rolled to remove the air voids without greatly reducing the wet laminate thickness.

After all the air was removed, the free end was sealed and the bagged wet laminate transferred to a press platen. The laminate was combined between shims disposed on both sides of the laminate and parallel to the direction of the fabric fill. The press was activated to a pressure of 25–50 p.s.i.g. While under pressure, heat was applied to the platens in the following cycle: 200° F. for 30 min., 250° F. for 30 min., and then 300° F. for 30 min. The platens were then removed from the press and allowed to cool between insulated plates.

After being cooled, the laminates were cut into pieces, 4 in. long in the fill direction by ½ in. in the warp direction. The various samples were then tested for flexural dry strength, short term flexural wet strength after two hours in boiling water, and long term flexural wet strength after 72 hours in boiling water. The results are tabulated below:

FLEXURAL STRENGTH, $10^3$ (p.s.i.)

| Sample No. | Dry | 2 hr. boil | 72 hr. boil |
|---|---|---|---|
| 1A | 57 | 60 | 39 |
| 1B | 63 | 68 | 49 |
| 1C * | 69 | 63 | 42 |
| 1D * | 62 | 57 | 33 |
| 2A | 55 | 56 | 39 |
| 2B | 67 | 68 | 56 |
| 2C * | 69 | 63 | 42 |
| 2D * | 56 | 53 | 40 |
| 2E * | 62 | 60 | 45 |
| 3A | 70 | 68 | 53 |
| 3B * | 69 | 63 | 42 |
| 3C * | 56 | 55 | 40 |
| 4A | 67 | 60 | 48 |
| 4B | 65 | 60 | 40 |
| 4C * | 59 | 58 | 30 |
| 4D * | 61 | 54 | 39 |
| 5A | 60 | 61 | 34 |
| 5B * | 63 | 64 | 38 |
| 5C * | 62 | 57 | 37 |

The results of this testing show that in the vast majority of cases my combined coupling agents exhibit superior overall dry/wet flexural strengths. For ease of comparison, those sample laminates which contain only the organo-chrome or the organo-silane coupling compositions are marked with asterisks (*).

EXAMPLE III

In addition to epoxy resin laminates, the compositions embodying my invention were also found to be advantageous when used with unsaturated polyester resin to form laminates.

To prepare the polyester resin used in this example, 1.5 g. of benzoyl peroxide crystals were dissolved in 15 g. of styrene and the solution added to 150 g. of a polyester resin consisting of 1 m. of phthalic anhydride, 1 m. of maleic anhydride and 2.2 m. of propylene glycol esterified to an acid number of between 30 and 45. A polyester of this description is available under the trade name of Paraplex P–43 manufactured by Rohm & Haas of Philadelphia, Pa. A small amount of hydroquinone was also added to prevent gellation.

The details of cutting the fabric and making the panels were the same as described in connection with the epoxy laminates. However, the bagged laminates were subjected to the following different heating schedule: 15 min. at 150° F., 15 min. at 200° F., and then 30 min. at 250° F. After cooling the laminates were tested as previously described. The flexural strength results for the polyester laminates were as follows:

FLEXURAL STRENGTH, $10^3$ (p.s.i.)

| Sample No. | Dry | 2 hr. boil | 72 hr. boil |
|---|---|---|---|
| 1B | 67 | 58 | 27 |
| 1C * | 55 | 33 | 22 |
| 1D * | 62 | 57 | 33 |
| 2B | 59 | 42 | 21 |
| 2C * | 55 | 33 | 22 |
| 2D * | 63 | 51 | 25 |
| 2E * | 72 | 64 | 38 |
| 4A | 71 | 64 | 40 |
| 4B | 70 | 65 | 34 |
| 4C * | 51 | 30 | 19 |
| 4D * | 57 | 56 | 37 |
| 5A | 72 | 67 | 37 |
| 5B * | 51 | 30 | 19 |
| 5C * | 62 | 57 | 33 |

It will be noted that as in the case of the results of Example II, those laminates prepared with my combined coupling composition consistently exhibit dry and wet flexural strengths superior to those laminates formed with only the organo-chrome or the organo-silane. For ease of comparison those sample numbers marked with an asterisk (*) are laminates which were formed by using only one coupling agent.

While the subject matter of this application has been mainly concerned with glass fibers and the treatment of same with the combined coupling compositions, it should be noted that it is contemplated that other compositions may be similarly treated. In particular, as a glass surface is a hydroxylated surface, the methods of this invention may be very well applicable to any hydroxylated surface such as silica powder, clays, aluminas, etc.

Having thus disclosed the invention, what is claimed is:

1. A method of treating hydroxylated surfaces which comprises olating in solution a substituted phenyl chromic chloride and an organo-silane of the general formula $$R-Si-X_3$$

wherein R is an organic resin reactive group and X is a hydrolyzable radical selected from the group consisting of chloro, amino, acetoxy and alkoxy, applying the olated product in solution to said hydroxylated surfaces, and drying said solution thereon.

2. A method of treating glass fibers which comprises hydrolyzing in an aqueous solution the combination of an organo-chromic chloride having an epoxy resin reactive group and an organo-silane of the general formula $$R-Si-X_3$$

wherein R is an organic resin reactive group and X is a hydrolyzable radical selected from the group consisting of chloro, amino, acetoxy and alkoxy, applying said solution to said glass fibers, and drying the solution on the fibers.

3. The method of treating glass fibers as defined in claim 2 wherein the pH of the solution is maintained from about 3.5 to 6.5.

4. The method of treating glass fibers as defined in claim 2 wherein said solution is dried on said glass fibers at temperatures of from about 225 to 335° F.

5. A method of treating glass fibers which comprises hydrolyzing in an aqueous solution the combination of a substituted phenyl chromic chloride and an organo-silane of the formula:

$$R-Si-X_3$$

wherein R is a polyester resin reactive group and X is a hydrolyzable radical selected from the group consisting of chloro, amino, acetoxy, and alkoxy, coating said fibers with said solution, and drying said solution on the fibers.

6. The method of claim 5 wherein said substituted phenyl chromic chloride is β-resorcylato chromic chloride and said organo-silane is methacroxypropyl trichloro silane.

7. The method of claim 5 wherein said substituted phenyl chromic chloride is β-resorcylato chromic chloride and said organo-silane is methacroxypropyl trimethoxy silane.

8. A woven glass fabric comprising glass fibers treated with a glass-resin coupling composition comprising the hydrolyzed product of a substituted phenyl chromic chloride and a polyester resin compatible organo-silane.

9. The glass fabric of claim 8 wherein said fabric consists of a woven top and a woven bottom, a multiplicity of tie threads connecting said top and said bottom, and stuffer yarns longitudinally disposed between said top and said bottom.

10. A glass-resin laminate having improved dry strength and long term wet strength comprising, in combination, a plurality of layers of a woven glass fabric, a glass-resin coupling composition chemically bonded to said glass fabric and comprising the hydrolyzed product of a substituted phenyl chromic chloride and a polyester resin compatible organo-silane, and an organic resin encapsulating said fabric layers and bonded to said coupling composition.

11. A glass-resin coupling composition for providing glass-resin bonds of improved dry and long term wet strength comprising a co-hydrolyzed substituted phenyl chromic chloride and a polyester resin compatible organosilane in an aqueous solution, said chloride and said silane each being employed in amounts of from about 0.25 to 0.5% by weight and in ratio to one another of from 90/10 to 10/90 parts.

12. The glass-resin coupling composition of claim 11 wherein said solution is generally maintained at a pH of from about 3.5 to 6.5.

13. The glass-resin coupling composition of claim 11 wherein β-resorcylato chromic chloride and methacroxypropyl trichloro silane are employed.

14. The glass-resin coupling composition of claim 11 wherein gallato chromic chloride and methacroxypropyl trimethoxy silane are employed.

15. The glass-resin coupling composition of claim 11 wherein gallato chromic chloride and glycidoxypropyl trimethoxy silane are employed.

16. The glass-resin coupling composition of claim 11 wherein gallato chromic chloride and anilinopropyl trimethoxy silane are employed.

17. The glass-resin coupling composition of claim 11 wherein β-resorcylato chromic chloride and methacroxypropyl trimethoxy silane are employed.

References Cited

UNITED STATES PATENTS

| | | | |
|---|---|---|---|
| 3,207,623 | 9/1965 | Marzocchi et al. | 65—3 X |
| 3,074,903 | 1/1963 | Fincke et al. | 156—329 X |
| 2,894,967 | 10/1959 | Gilkey | 260—438.5 X |
| 2,544,667 | 3/1951 | Goebel et al. | 260—438.5 X |
| 2,544,666 | 3/1951 | Goebel et al. | 260—438.5 X |

ROBERT F. BURNETT, *Primary Examiner.*

M. A. LITMAN, *Assistant Examiner.*

U.S. Cl. X.R.

117—126; 161—185, 194; 260—438.5, 448.2